Feb. 21, 1956  F. H. MUELLER ET AL  2,735,123
PIPE CLEANING TOOL
Filed July 2, 1952  2 Sheets-Sheet 1
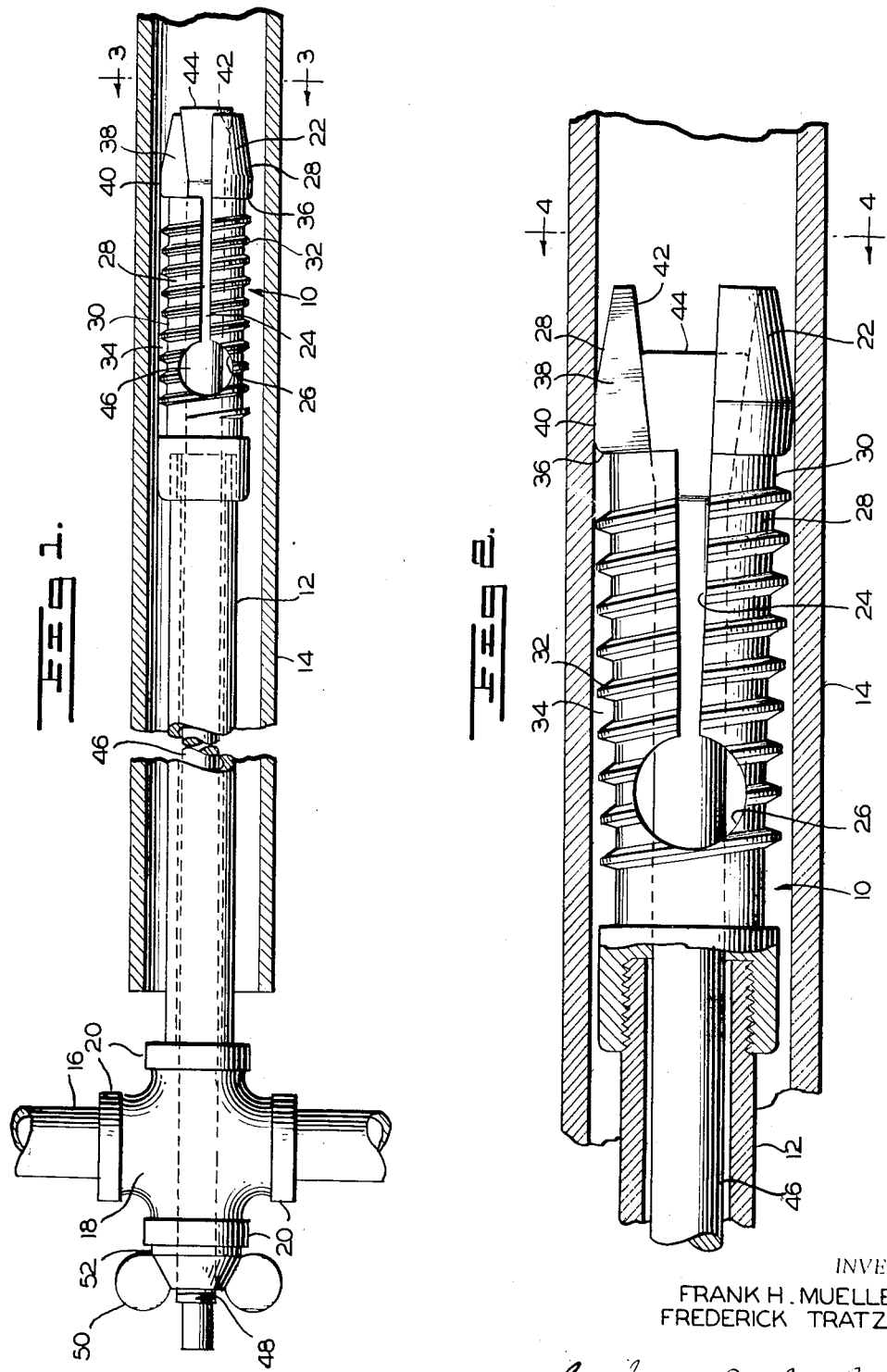
INVENTOR
FRANK H. MUELLER
FREDERICK TRATZIK
BY Cushman, Darby & Cushman
ATTORNEY

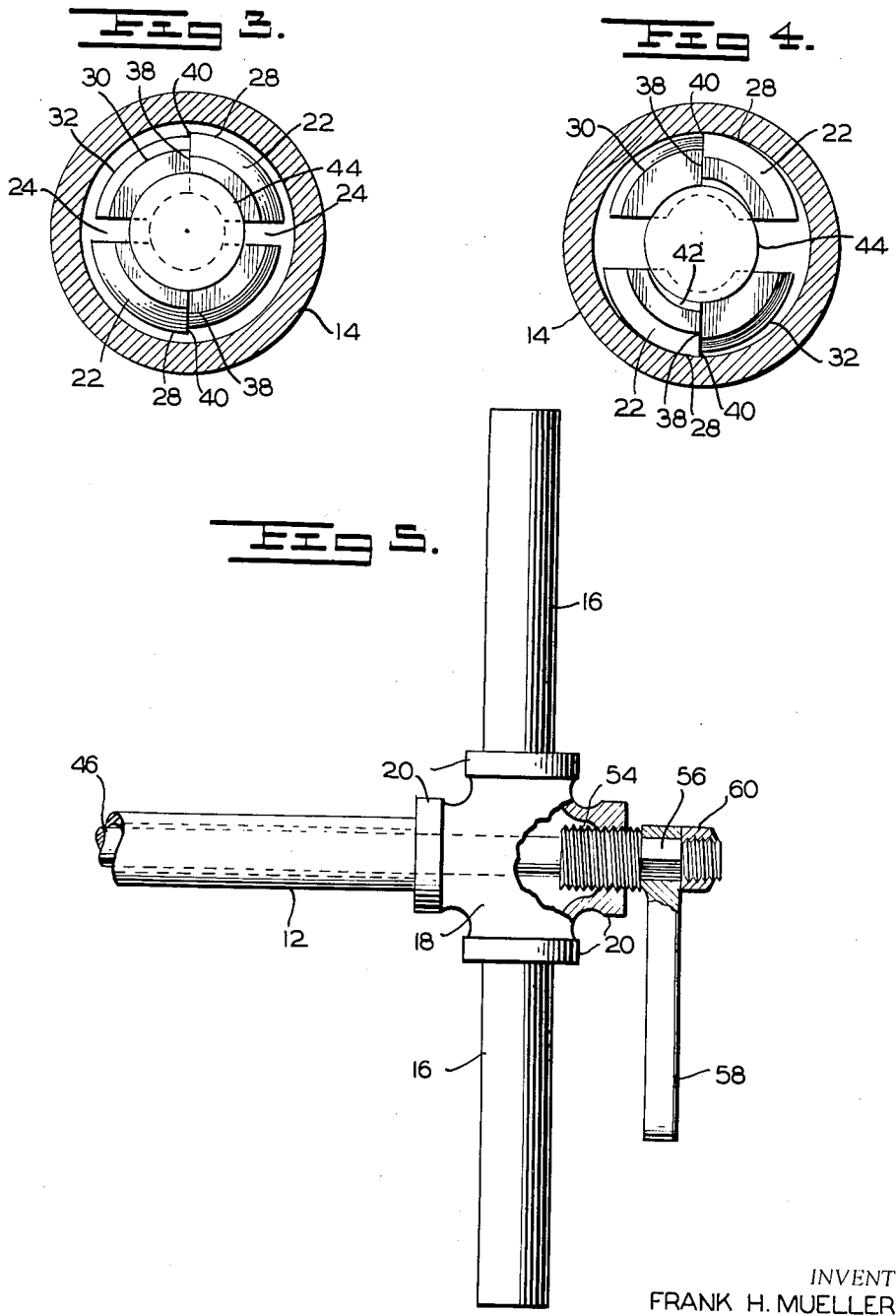

United States Patent Office 2,735,123
Patented Feb. 21, 1956

2,735,123

PIPE CLEANING TOOL

Frank H. Mueller and Frederick Tratzik, Decatur, Ill., assignors to Mueller Co., Decatur, Ill., a corporation of Illinois Application July 2, 1952, Serial No. 296,842

5 Claims. (Cl. 15—104.09)

This invention relates to a pipe cleaning tool, and more particularly to a tool for scraping the interior of a gas service pipe to provide a smooth interior surface therein for effective engagement by the sealing gaskets of a by-pass assembly of the type disclosed, for example, in the patent to Barber, No. 2,543,954, issued March 6, 1951. It will be realized, however, that a tool embodying this invention may be used for cleaning and scraping the interior of other types of pipes or tubular elements for other purposes.

Tools for cleaning and scraping the interior of pipes and tubes are, of course, well known. Such tools, however, not only are relatively complicated with consequent high manufacturing expense, but also embody no provision for the removal of the scrapings, i. e. rust, corrosion, dirt, and similar material, from the interior of horizontal pipes and conduits. The rust and corrosion occurring in gas service pipes is quite appreciable and for the effective installation of a by-pass assembly of the type disclosed in the aforementioned patent, it is necessary not only that the interior of the pipe be provided with a smooth surface for engagement by the sealing gaskets of the by-pass assembly, but also that the scraped-off rust and corrosion be withdrawn from the pipe. If such scrapings are not withdrawn, they may become lodged between the aforementioned sealing gaskets and the interior wall of the pipe, with resulting leakage through the seal.

Accordingly, it is an object of this invention to provide a pipe cleaning tool of the type described that not only is simple in design with consequent lessened manufacturing expense, but also is easy to use and is effective for its intended purpose.

It is another object of this invention to provide a pipe cleaning tool of the type described which will provide a smooth clean surface on the interior of a pipe or the tube and also will remove the scrapings from the pipe with the tool upon withdrawal of the latter.

Other objects and advantages of this invention will become apparent from the following description and accompanying drawings, in which:

Figure 1 is an elevational view of a pipe cleaning tool embodying this invention and showing the tool inserted within a section of a gas service pipe.

Figure 2 is an enlarged fragmentary view illustrating the operating head of the tool shown in Figure 1 and showing such head expanded into scraping engagement with the interior walls of the pipe.

Figure 3 is an enlarged sectional view taken on the line 3—3 of Figure 1.

Figure 4 is a sectional view taken on the line 4—4 of Figure 2.

Figure 5 is a fragmentary elevational view, partly in section, of a modified form of the tool shown in Figure 1.

Referring now to the drawings, there is shown in Figure 1 a pipe cleaning tool having a tubular head 10 into the rear end of which is threaded an elongated tubular operating member or body 12, which latter is of a length for extending from the open end of a pipe 14 to the farthest section thereof to be cleaned by the tool. The operating member 12 conveniently may be formed by a section of pipe having exteriorly threaded ends. To the rear end of the operating member 12 there are secured a plurality of radial handles 16 for manipulation of the cleaning tool within the pipe 14. These handles 16 may be in the form of short pipe sections which are secured to the rear end of the pipe section 12 by means of a pipe fitting cross 18 having interiorly threaded hubs 20 into which the handles 16 and the operating member 12 are threaded, as illustrated best in Figure 1.

The head 10 of the pipe cleaning tool has a somewhat tapered nose 22 to facilitate the insertion of the tool within the pipe 14. Extending rearwardly from the forward end of the head 10 are two diametric slots 24 terminating in circular cut-outs 26 and which divide the head into two resilient fingers 28, each of equal circumferential width. Although only two such fingers 28 are shown in the construction illustrated, it will be realized that the head may be divided by more than two slots, three for example and each spaced 120° from the others, to provide more than two such resilient fingers, each such finger being of equal circumferential width. Intermediate its ends, the head 10 is exteriorly reduced in diameter and such reduced portion 30 is provided with a helical rib 32 that completely encircles the head, save where interrupted by the slots 24, and is of low pitch. The rib 32 is relatively narrow to provide a relatively wide helical groove 34 between the convolutions of the rib, while the diameter of the rib is substantially equal to the major diameter of the head 10. The purpose of the rib 32 will be described more fully hereinafter.

Forwardly of the shoulder 36 formed at the forward end of the reduced portion 30 of the head, each resilient finger 28 is relieved along one side, i. e. cut away as at 38, so that the forward end of each finger is circumferentially narrower than that portion thereof rearwardly of the shoulder. Each finger 28 is thus provided, adjacent its forward end and at the midpoint of its major circumferential width, with a scraping edge 40 located just forwardly of the reduced portion 30 of the head 10. It will be noted that the scraping edge 40 of each finger is circumferentially spaced about 90° from the side of the adjacent finger for purposes later described.

In order to effect scraping engagement between the edges 40 and the inner walls of the pipe 14, the head 10 is provided with interior expanding means to force the fingers 28 radially against the interior walls of the pipe. For this purpose the forward end of the head 10 is provided with an outwardly flaring interior surface 42 for wedging and, therefore expansive, engagement by a correspondingly flared or tapered expanding head 44. The expanding head 44 is mounted on an expanding rod 46 which extends rearwardly through the head 10, operating member 12, and the pipe fitting cross 18, and projects out of the rear hub 20 of the latter. Threads 48 are provided on the outwardly projecting rearward end of the expanding rod 46 and a wing nut 50 is mounted thereon with a thrust washer 52 interposed between such nut and the rear hub 20 of the pipe fitting cross 18.

From this construction it will be seen that when the wing nut 50 is turned in one direction, the expanding rod 46 is drawn rearwardly with respect to the head 10 and the operating member 12 to thereby cause the tapered expanding head 44 to expand the resilient fingers 28 and thereby force the scraping edges 40 into effective engagement with the interior walls of the pipe 14, as best shown in Figure 2.

In use of the pipe cleaning tool, the head 10 is collapsed, i. e. the expanding head 44 is moved forward so that the inherent resiliency of the fingers 28 returns them to their normal position shown in Figure 1, and the tool is grasped by its handles 16 and inserted to its full length into a service pipe to be cleaned. Thereupon the wing nut 50 is tightened in a direction to draw the expanding rod 46 rearwardly and thereby expand the tool head 10 into effective scraping engagement with the interior walls of the pipe. Thereafter, by means of the handles 16, the tool is simultaneously rotated and reciprocated back and forth in the pipe while gradually withdrawing the entire tool from such pipe. The rotation of the head 10 serves, by means of the scraping edges 40, to scrape the dirt, rust, corrosion, and like undesirable material from the interior walls of the pipe and thereby provide a smooth clean surface thereon. The thus-removed scrapings will fall into the bottom of the pipe and by the reciprocation of the tool, together with the simultaneous rotation thereof, will be collected by the helical rib 32 into the groove 34 between the convolutions thereof.

This collection of the scrapings is facilitated by the relatively large circumferential or angular spacing between each scraping edge 40 and the opposed side of the adjacent finger 28, which spacing permits such scrapings to pass rearwardly therebetween, i. e. on the forward stroke of the tool, and to be collected by the helical rib 32. Accordingly, after the desired section of the pipe has been thus cleaned, withdrawal of the tool from the pipe will remove the scrapings therewith.

Referring now to Figure 5 of the drawings, in some instances because of the relatively large frictional engagement between the interior flare 42 on the tool head 10 and the tapered expanding head 44, it may be relatively difficult to collapse the tool head. Therefore, in such instances it is desirable to provide the tool with means for positively producing relative axial movement between the expanding rod 46 and the tool head 10 in a direction which will relieve the expansion of the tool head by the expanding head 44. This function may be accomplished by providing the rearward end of the expanding rod 46 with exterior threads 54 which are proportioned for engagement with the interior threads in the rear hub 20 of the pipe fitting cross 18. With this construction, it will be seen that rotation of the expanding rod 46 in one direction serves to expand the tool head 10, while rotation in the opposite direction positively relieves the expansion of the tool head by the tapered expanding head 44, so that the resilient fingers 28 may resume their collapsed or contracted normal position. For the purpose of facilitating the rotation of the expanding rod 46 in this construction, the projecting outer end of the same may be squared, as at 56, for reception of a complementary socket on a radial handle 58 which is secured in place by a nut 60 threaded onto the extreme outer end of the expanding rod.

It will thus be seen that the objects of this invention have been fully and effectively accomplished. It will be realized, however, that the specific embodiment shown and described for the purpose of illustrating the principles of this invention is subject to modification without departing from such principles. Therefore, this invention includes all modifications encompassed within the spirit and scope of the following claims.

We claim:

1. A pipe cleaning tool comprising: an elongated tubular head having a plurality of longitudinal slots extending inwardly from one end thereof to divide said head into a plurality of resilient fingers; at least one longitudinal peripheral scraping edge on and adjacent the forward end of each of said fingers; a helical rib on said head partially interrupted by said slots and encircling said head rearwardly of said edges; an elongated operating body extending rearwardly of said head; and means for expanding said head.

2. The structure defined in claim 1 in which the head is reduced in diameter rearwardly of the scraping edges and the helical rib is of substantially the same diameter as that portion of said head containing said scraping edges.

3. A scraping head for a pipe cleaning tool comprising: an elongated tubular member adapted for attachment to an elongated operating body and having a plurality of longitudinal slots extending inwardly from one end thereof to divide said member into a plurality of resilient fingers, said member being interiorly shaped for cooperation with interior expansion means; at least one longitudinal peripheral scraping edge on and adjacent the forward end of each of said fingers; and a helical rib encircling said member rearwardly of said scraping edges and being partially interrupted by said slots.

4. The structure defined in claim 3 in which said rib is of low pitch and of a diameter substantially equal to that of said scraping edges.

5. The structure defined in claim 3 in which a side of each finger is relieved adjacent the forward end thereof to provide the corresponding longitudinal scraping edge at substantially the midpoint of the major circumferential width of each said finger.

References Cited in the file of this patent

UNITED STATES PATENTS

| | | |
|---|---|---|
| 92,790 | Brown | July 20, 1869 |
| 504,569 | Dunn | Sept. 5, 1893 |
| 815,043 | Scheer | Mar. 13, 1906 |
| 990,977 | Griffith | May 2, 1911 |
| 1,704,364 | Markley | Mar. 5, 1929 |
| 2,205,757 | Wheat | June 25, 1940 |

FOREIGN PATENTS

| | | |
|---|---|---|
| 12,919 | Germany | of 1881 |
| 24,300 | Great Britain | of 1902 |